US008386915B2

(12) United States Patent
Howes et al.

(10) Patent No.: US 8,386,915 B2
(45) Date of Patent: Feb. 26, 2013

(54) INTEGRATED LINK STATISTICS WITHIN AN APPLICATION

(75) Inventors: Timothy Howes, Los Altos, CA (US); Eric Vishria, San Carlos, CA (US)

(73) Assignee: RockMelt, Inc., Moutain View, CA (US)

( * ) Notice: Subject to any disclaimer, the term of this patent is extended or adjusted under 35 U.S.C. 154(b) by 154 days.

(21) Appl. No.: 12/843,792

(22) Filed: Jul. 26, 2010

(65) Prior Publication Data

US 2012/0023390 A1    Jan. 26, 2012

(51) Int. Cl.
*G06F 17/00* (2006.01)
(52) U.S. Cl. .................................... 715/205; 715/206
(58) Field of Classification Search ............ 715/208, 715/206
See application file for complete search history.

(56) References Cited

U.S. PATENT DOCUMENTS

| | | | |
|---|---|---|---|
| 2004/0059997 A1* | 3/2004 | Allen et al. | 715/501.1 |
| 2004/0255237 A1* | 12/2004 | Tong | 715/501.1 |
| 2006/0004892 A1* | 1/2006 | Lunt et al. | 707/204 |
| 2007/0156761 A1 | 7/2007 | Smith, III et al. | |
| 2008/0005073 A1 | 1/2008 | Meek et al. | |
| 2008/0229217 A1 | 9/2008 | Kembel et al. | |
| 2008/0250026 A1 | 10/2008 | Linden et al. | |
| 2008/0294760 A1* | 11/2008 | Sampson et al. | 709/223 |
| 2009/0089678 A1 | 4/2009 | Sacco et al. | |

OTHER PUBLICATIONS

Bit.ly Sharing and Shortening Links, Jul. 20, 2009, AppAppeal, pp. 1-7.*
Bit.ly a simple url shortener, Bit.ly FAQ, Nov. 18, 2009, bit.ly, pp. 1-3.*
Screenshots 1-2 AppAppeal, Jul. 20, 2009.*
PCT International Search Report and Written Opinion, PCT Application No. PCT/US11/41128, Oct. 20, 2011, 20 pages.
"Bit.ly: Take a tour around bit.ly," [Online] [Retrieved Aug. 31, 2010] Retrieved from the Internet<URL:http://bit.ly/a/tour/track>.
U.S. Appl. No. 12/765,812, filed Apr. 22, 2010.

* cited by examiner

*Primary Examiner* — Cesar Paula
*Assistant Examiner* — Howard Cortes
(74) *Attorney, Agent, or Firm* — Fenwick & West LLP

(57) ABSTRACT

To enhance the user experience for users of an application, such as a web browser, the application obtains statistics on shortened links that are displayed in an application or that are associated with displayed unshortened links. The statistics may include, for example, a number of times that content available via an unshortened link was viewed via its associated shortened link. The statistics are applied to enhance the ability of users of the application to locate relevant content. For example, the statistics may be shown in visual association with a link, or a set of links may be ordered at least in part based on the statistics associated with the links, or the links may be visually emphasized based on the statistics.

15 Claims, 4 Drawing Sheets

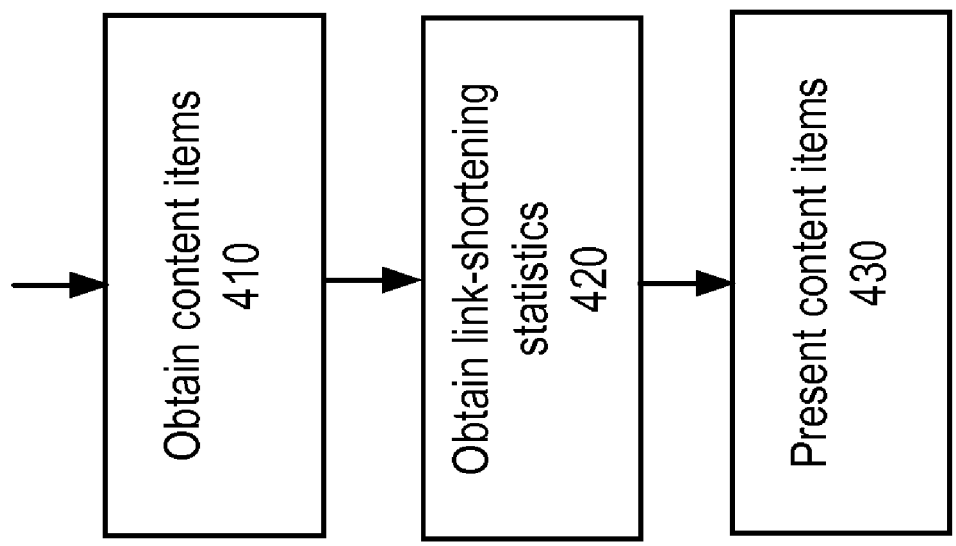

INTEGRATED LINK STATISTICS WITHIN AN APPLICATION

CROSS REFERENCE TO RELATED APPLICATIONS

This application is related to application Ser. No. 12/698,064, filed on Feb. 1, 2010 and entitled "Integrated Saved Search Results," and to application Ser. No. 12/765,812, filed on Apr. 22, 2010 and entitled "Integrated Adaptive URL-Shortening Functionality," which is incorporated herein by reference.

BACKGROUND

The present invention generally relates to the field of software systems, and more specifically, to techniques for using statistics on link usage within the user interface of an application. The links to which the statistics pertain may be shortened links produced by a link-shortening service, or may also be unshortened links for which a shortened form has been created on some link-shortening service, or unshortened links for which no shortened form is known to have been created.

Users of the Internet frequently share links (e.g., URLs) related to content of interest. For example, a user might share a web page of interest with the user's friends by typing or pasting the web page's URL into an email; into a text message of a social networking or microblogging service, such as TWITTER; or into a message posting to be placed on the user's page on a social networking site, such as FACEBOOK.

The length of links often proves inconvenient for sharing purposes. For example, a URL having a lengthy domain name and/or path may be inadvertently broken across multiple lines when processed by email systems, thus rendering it incapable of being used directly when clicked on by a recipient of the email. Also, message sharing services, social networking sites, and other online messaging systems may impose maximum character requirements on a user's messages, thereby restricting the use of long URLs in a message. Furthermore, long URLs can appear indecipherable and intimidating to users, leading to user reluctance to click on them.

For these reasons, URL shortening services have been created to facilitate the shortening of URLs and the subsequent use thereof. A typical URL shortening service saves a mapping between an original unshortened URL and a shortened version thereof. When a user clicks a shortened URL, the user's computer obtains a page from the URL shortening service, which then redirects the user's computer to the original version of the URL that was associated with the shortened version.

The URL shortening services used to shorten the URLs also typically track statistics about the use of content such as web pages through the associated shortened URLs. For example, a URL shortening service might track how many times a particular web page was viewed via clicks on a particular shortened URL associated with the web page, or an aggregate number of times the web page was accessed via clicks on any of its shortened links, or the number of distinct times that the URL was shortened as a proxy for the number of people who shared the URL.

Statistics may be obtained for URLs—including unshortened URLs—in other ways, as well. These statistics constitute valuable information about the URLs and associated content to which they correspond, but the information is not currently leveraged to provide viewers of content with insights about the relevance of the associated content.

SUMMARY

To provide an improved user experience for users of an application, such as a web browser, embodiments of the invention obtain statistics for links that are displayed in an application. More specifically, the application obtains a list of links (or items containing links), such as a list of search results having associated links, or social network messages having embedded links. The links may include both original unshortened links and shortened links produced by a link-shortening service. The application also obtains link statistics from a statistics source, where the statistics may include, for example, a number of times that content available via an unshortened link was viewed via its associated shortened link. The statistics are applied to enhance the ability of users of the application to locate relevant content. For example, the list of links (or items containing links) may be ordered at least in part based on the statistics associated with the links. Alternatively and/or additionally, the statistics may be displayed in visual association with one or more of the links, or the links may be visually emphasized based on the statistics.

BRIEF DESCRIPTION OF DRAWINGS

FIG. 4 is a flowchart of a process performed by the application of FIG. 1, according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
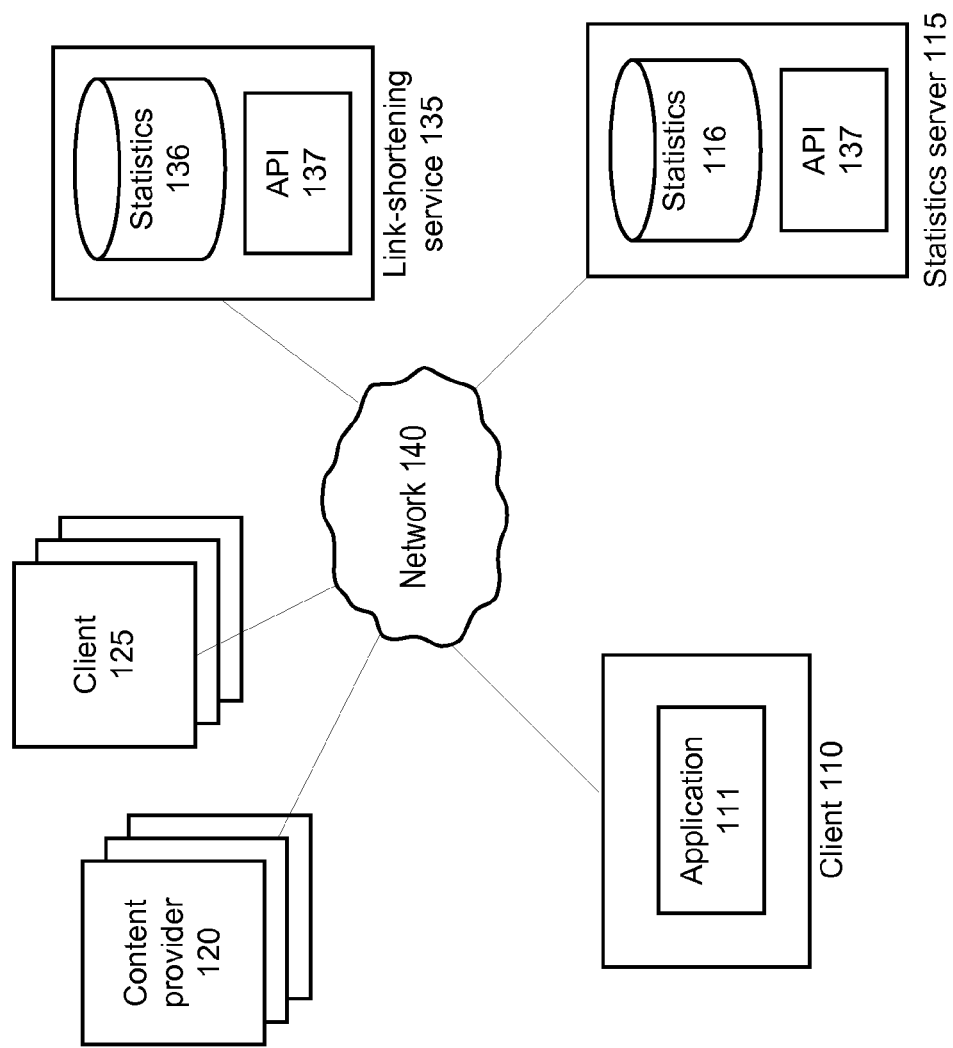
FIG. 1 is a high-level block diagram of a computing environment according to one embodiment.

FIG. 1 is a high-level block diagram of a computing environment 100 according to one embodiment. FIG. 1 illustrates clients 110 and 125, remote content providers 120, remote link-shortening service 135, and an optional statistics server 115, connected by a network 140.

In brief, a user using a client 125 views content items (e.g., a web page) from the remote content provider 120. Some content items, such as web pages, are accessible via a link (e.g., a URL) that identifies the content item. The user of the client 125 may also use the link-shortening service 135 to create and register a shortened version of the link, which the user then disseminates to other users of other clients 125, e.g. within postings on social networks, text messages, web pages, and other content items. The other users then access the content via the shortened link, e.g., by clicking on the shortened link, and the link-shortening service 135 provides the full link to the accessed content and updates statistics on the use of the shortened link. A user of the client 110 uses an application 111 (e.g., a web browser) to view content items containing a shortened link. The application 111 further obtains the statistics stored by the link-shortening service 135 and presents them to the user and/or uses them as one factor influencing the presentation of the content item(s).

In one embodiment, the application 111 (e.g., a web browser) tracks statistics on user interactions with the links shown within the application user interface and provides them to a statistics server 115, which aggregates the statistics from the client 110 and any other clients running the application. The application 111 may then obtain statistics from the statistics server 115 instead of, or in addition to, obtaining them from the link-shortening service 135.

The various portions of the computing environment 100 are now described in more detail.

The content provider 120 provides content items viewable by the clients 125 and 110. The content provider is located remotely from the clients, i.e., on a separate physical computing device accessible via the network 140. For example, the content provider 120 could be a web server providing web pages accessed via associated URLs, the web pages being viewed using browser applications of the clients 125, 110.

The content provider 120 may alternatively and/or additionally act as a web feed server. A web feed is a data format used for providing periodically updated content to clients that have subscribed to the feed. Typically, a content provider publishes a web feed and provides through the web feed updated data for the subscribers to the feed. Examples of web feeds include feeds that provide news headlines on a news website, weather forecasts, stock tickers, the status information of online friends of a social networking service, and updates made to a user's online friends' web pages. To receive a feed, a user typically first registers the feed with an aggregator running on the user's client. Once a feed is registered with an aggregator, the aggregator periodically checks for any updated data available on the feed and retrieves the updated or new feed data.

The content provider 120 may make discrete units of its data available to clients, similar to the way in which a feed server provides discrete data units in a feed. The discrete data units represent individual objects with semantic meaning, such as message posting objects, user objects, and group objects on a social network, or individual messages on a message sharing service. For example, a content provider 120 providing a social network might not only provide web pages presenting the aggregate data for a particular user, such as a set of message postings of a particular user, but might additionally make the individual user postings themselves individually accessible, e.g. via a search application programming interface (API). Such discrete data units may, but need not be, associated with a link (e.g., a URL).

A content provider 120 might also act as a search engine, such as GOOGLE, indexing web pages or other documents of other content providers and providing a set of search results in response to a query, each search result having a link to the web page or other document described by the search result.

Thus, the clients 110, 125 can obtain a variety of content items from different content providers 120, such as web pages (either through manual entry of associated URLs or through search results provided by a search engine), individual discrete data units such as user postings (e.g., by querying a social network) received either via a feed or in response to a query, and the like.

The various content items provided by the content providers 120, such as web pages, feed items, and individual discrete data units, may have links embedded within them, and these links may be in shortened form. For example, a message sent by a user to subscribers via a message sharing service such as TWITTER might include the URL of a video that the user considered interesting. The URL may be represented in shortened form within the message due to automatic shortening by the message sharing service, manual shortening by the user, or the like.

The link-shortening service 135 registers an unshortened link in association with a shortened version of the link, the shortened version of the link having a domain name corresponding to the link-shortening service 135. A "link," as described herein, comprises address text that points to a web page or other content available via a network such as the Internet. One common example of a link is a uniform resource locator (URL), which has address text such as http://www.interestingsite.com/presentations/gkchesterton/2006/essays.html pointing to a document essays.html, and the description set forth below frequently refers to URLs. However, it is appreciated that links are not limited to URLs, but may include uniform resource identifiers (URIs) or other textual means of identifying documents or other content. As an example of link shortening, the original URL http://www.interestingsite.com/presentations/gkchesterton/2006/essays.html might be shortened to http://short.com/qwy128. Requests to view the content corresponding to a shortened URL are made to the link-shortening service 135 (e.g., to a system corresponding to the domain short.com), which looks up the original URL based on the path portion of the shortened URL (e.g., qwy128), determines the associated original URL, and causes a redirect to the content associated with the original URL, e.g., via an automatic HTTP redirect using HTTP 3xx status codes.

For purposes of future discussion, note that a URL is of the form protocol://username:password@domain:port/path?query_string#anchor, where many of these components are optional. Thus, the original URL above has protocol "http", domain "www.interestingsite.com", and path "presentations/gkchesterton/2006/essays.html".

The link-shortening service 135 additionally updates its statistics 136 to reflect the use of the shortened link. The statistics 136 tracked by the link-shortening service 135 may include a variety of different kinds of information on the use of the shortened link, such as a number of clicks on the shortened link, domains or countries from which the clicks came, a distribution of the clicks over time, distribution of the clicks over demographic data such as age, household income, etc. (if available), and the like. The link-shortening service 135 further has an interface for providing the tracked statistics 136, or some subset or derived form thereof, to clients. For example, the link-shortening service 135 may provide a summary web page accessible to a registered user of the service, the summary web page presenting a summary of the various statistics 136. The link-shortening service 135 further provides an application programming interface (API) 137—e.g., a web services-based API—that clients may use to programmatically obtain the statistics. The statistics 136 may not be associated solely with a particular shortened URL, but may additionally be associated with the original unshortened link to which the shortened version of the link refers. For example, the link-shortening service 135 might provide not only statistics about a shortened URL http://short.com/qwy128, such as that it was clicked 227 times, but also might provide statistics about the original unshortened URL, such as that that the original unshortened URL http://www.interestingsite.com/presentations/gkchesterton/2006/essays.html was accessed via shortened URLs a total of 5,256 times (e.g., 227 times via the shortened URL http://short.com/qwy128, and the remaining 5,029 times via other shortened versions).

The client 110 uses the application 111, such as a web browser, to view content items provided by the content providers 120 via the network 140. The application 111 comprises a number of modules, described in more detail below with respect to FIG. 2, to obtain content including links and statistics associated with the links, and to present information according to the statistics. In some embodiments, the application 111 itself contributes to the creation of the statistics. User interfaces of the application 111 are described below with respect to FIG. 3.

In one embodiment, the application 111 has a user interface displaying links with which the user can interact and tracks statistics on user interactions with the links shown within the user interface. For example, in one embodiment the application 111 is a custom web browser and tracks counts of how often a given link has been clicked, how often and by what techniques the link has been shared, total time spent viewing content pointed to by the link, and the like, such statistics being applicable to both shortened and unshortened links. The tracked statistics need not be of the same types as those tracked by the link-shortening service and stored in the statistics repository 136. The application 111 may also associate each statistic with a user with whom the statistic is associated: for example, a link click statistic can be associated with the user who clicked the link. The user identity may be represented by an identifier specific to the application 111 itself, to an identifier corresponding to an external account on a social network, or the like. The application 111 provides the tracked link statistics to the statistics server 115.

The statistics server 115 then aggregates the statistics from the client 110—and any other clients that run the application and report their tracked statistics to the statistics server—storing the aggregated statistics in a statistics repository 116. The aggregation may include computing totals for each statistic (e.g., link click counts) across all of the clients or computing an average of the statistics, and may include all the statistics or only the statistics for a particular time period of interest. The statistics server may additionally store user information in order to associate the statistics with particular users via any user identities provided in association with the statistics. For example, an identifier of a particular user of the application 111 could be associated with a social networking account of that user, so that a statistic associated with that user can be further associated with information about that user from the user's social network account (for example). The statistics server further provides an API 117 by which a client 110 can obtain desired statistics. The application 111 may then obtain statistics from the statistics server 115 instead of, or in addition to, obtaining them from the link-shortening service 135.

The content provider 120 may be implemented by any device capable of serving content to clients, such as a conventional computer server system running a web server process. Similarly, the clients 125 and the client 110 may be implemented by any computing device capable of viewing content over the network 140, such as a personal computer, laptop computer, personal digital assistant, or mobile phone. It is appreciated that although the clients 110 and 125 are depicted as conceptually separate, with certain content viewing and link-shortening operations being performed by the clients 125, and viewing of the resulting shortened links being performed by the client 110, any or all of these operations may be performed by a client 110.

For simplicity, FIG. 1 depicts only one link-shortening service 135, one statistics server 115, and one client 110, although it is appreciated that there could be any number of each. For example, a client 125 could use any number of different link-shortening services 135. Similarly, a given link-shortening service 135 might be replicated or otherwise distributed across multiple servers for purposes such as load balancing.

The network 140 represents the communication pathways between the client 110 the content providers 120, the clients 125, and the link-shortening service 135. In one embodiment, the network 140 uses standard Internet communications technologies and/or protocols. Thus, the network 140 can transmit data using technologies such as Ethernet, 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), the extensible messaging and presence protocol (XMPP), etc. The data exchanged over the network 140 can be represented using technologies and/or formats including the hypertext markup language (HTML), the extensible markup language (XML), JavaScript object notation (JSON), the really simple syndication (RSS) format, etc. In addition, all or some links can be encrypted using conventional encryption technologies such as the secure sockets layer (SSL), transport layer security (TLS), secure HTTP (HTTPS) and/or virtual private networks (VPNs). In another embodiment, the entities can use custom and/or dedicated data communications technologies instead of, or in addition to, the ones described above.

Figure 2:
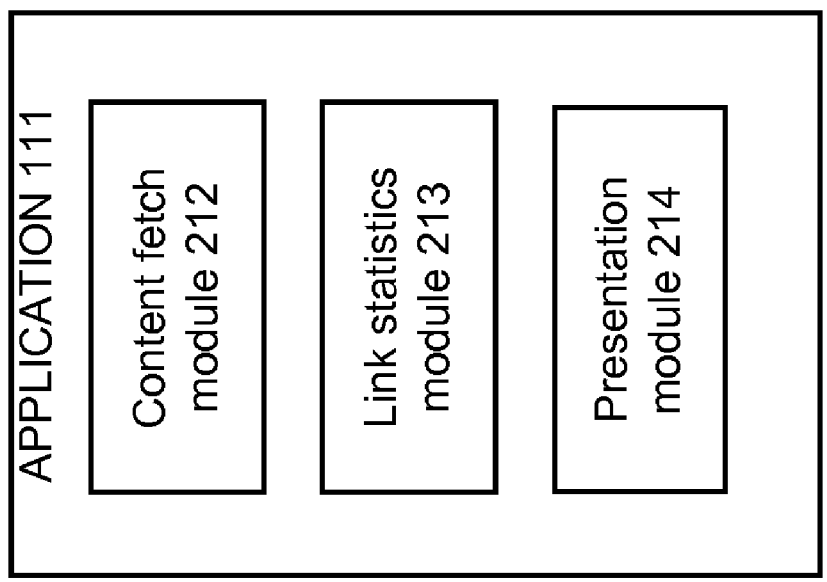
FIG. 2 is a block diagram of an application and its modules for obtaining statistics associated with shortened links and presenting the links accordingly, according to one embodiment.

FIG. 2 is a block diagram of the application 111 and its modules for obtaining statistics associated with links and presenting the links accordingly, according to one embodiment. The application 111 comprises a content fetch module 212 for obtaining content provided by content providers 120, a link statistics module 213 for obtaining statistics on links (as stored by the link-shortening service 135, or optionally by the statistics server 115), and a presentation module 214 for presenting information on content in accordance with the obtained statistics.

More specifically, the content fetch module 212 obtains content items from the content providers 120. The content items may comprise links such as URLs. For example, each search result from a search engine content provider comprises an unshortened URL that links to the content referenced by the search result. Similarly, a message posting from a social networking service or a textual message from a message sharing service may include one or more shortened or unshortened URLs added to the body of the posting/message by a user to reference external content that the author of the posting/message wished to share.

The content fetch module 212 obtains the content items from the content providers 120 using the method of requesting that the various content providers accept. For example, to obtain a search result of a search engine content provider 120, the content fetch module 212 submits a query, such as a textual string of query terms. Similarly, to obtain a set of discrete data units such as user status updates or message postings from a social network content provider 120, the content fetch module 212 uses the API provided by the social network (e.g., a web services-based API) to submit a query for the units of interest, such as message postings containing a certain set of keywords.

The link statistics module 213 obtains statistics for a given link from one or more statistics sources, such as a link-shortening service 135 and/or a statistics server 115. The links for which statistics are obtained may be in either a shortened form produced by the link-shortening service 135, or they may be in their original, unshortened forms. When obtaining statistics for a shortened form of a link, the link statistics module 213 queries the link-shortening service 135 that created the shortened form for its stored statistics 136 using the link-shortening service's API 137. (As noted, the particular link-shortening service 135 that created the shortened form can be determined from the domain name of the shortened link.) As one example, the obtained statistics for a particular shortened link might state that the shortened link had been clicked (i.e., the associated contents had been viewed using the shortened link) 345 times.

In one embodiment, the link statistics module 213 additionally obtains statistics for an unshortened form of a link based on the statistics for the various shortened forms (if any) of the unshortened link on one or more link-shortening services 135. For example, the link statistics module 213 might submit a query for statistics on the unshortened link to each of a predetermined set of well-known link-shortening services 135 that provide statistics for an unshortened link. In this case, each link-shortening service 135 aggregates its statistics, such as the aggregate number of clicks, for all the registered shortened forms of the unshortened link and provides the aggregated statistics to the link statistics module 213 in response to a request via the API 137. As one example, to obtain statistics for the unshortened URL http://www.interestingsite.com/presentations/gkchesterton/2006/essays.html, the link statistics module 213 might query a first link-shortening service and obtain the statistic that the shortened forms of that URL registered with the first link-shortening service were clicked an aggregate 2,017 times, and further query a second link-shortening service and obtain the statistic that the shortened forms of the second link-shortening service were clicked an aggregate 1,312 times. The link statistics module 213 could then report that the shortened forms of the unshortened URL were clicked a total of 3,329 times across both link shortening services.

Thus, the link statistics module 213 may (for example) obtain statistics for the unshortened link of a search result obtained from a search engine, as well as from a shortened link located in the body of a content item such as a posting from a social network or message-sharing service or other discrete data unit.

In one embodiment, the link statistics module 213 further processes the statistics provided by the statistics source (e.g., the link-shortening service or the statistics server 115) to further enhance the relevance of the statistics for the user of the application 111. For example, the link statistics module 213 may obtain information about the user from a social network, such as the identities of the user's friends, and filter the statistics to include only those corresponding to the user or the user's friends, or provide a greater weight to those statistics than to the other statistics. The ability to identify a particular user associated with a particular statistic is enhanced when the statistics are obtained from a statistics server 115 that tracks identities of application users from which the statistics were derived. In one embodiment, such further processing of statistics is performed by the statistics server 115 itself.

In one embodiment, the link statistics module 213 obtains the statistics from the statistics server 115 instead of, or in addition to, the statistics obtained from the link-shortening service 135. That is, the link statistics module 213 of the application 111 can query the statistics server 115 for any statistics that it may have related to a given link (either shortened or unshortened). If the application 111 on the client 110 or any other client 110 or 125 had tracked statistics on that link and provided them to the statistics server 115, then statistics would be available for that link. If statistics on a given link are available from both the link-shortening service 135 and the link statistics server 115, the link statistics module 213 may select one or the other, or may combine them.

In one embodiment, the link statistics module 313 calculates a relevance measure of a link based at least in part on the associated link statistics. In one embodiment, the relevance measure determination is user-specific, and thus is based on additional information known about the user of the application 111, such as browsing history, interests, profile information obtained from a social network, friends on the social network, or the like. The relevance measure may be derived from a particular one of the statistics—such as link click count—or it may be derived from a combination of multiples ones of the statistics. As an example of the latter, the relevance measure could be a score based on the click counts on the link by the user's friends on a social networking service, and on the total spent by those friends viewing the content pointed to by those links. Relevance measures above some predetermined relevance threshold may be considered to indicate that the link is highly relevant, and thus should be treated differently from other links, such as being displayed with a special visual emphasis.

The result presentation module 214 applies the shortened link statistics to affect the presentation of the various content items obtained by the content fetch module. In one embodiment, the result presentation module 214 displays a graphical representation of the statistics in visual association with a link within the user interface of the application 111. For example, when a link is designated, such as by moving the mouse cursor over the link, the result presentation module may display the statistics within tooltip text in association with the link. The result presentation module 214 may additionally provide a graphical shortcut to a page of the link-shortening service 135 displaying the statistics, such as a link to a statistics summary web page of the link-shortening service. In one embodiment, the result presentation module 214 provides the graphical representations of the statistics for unshortened as well as shortened links, provided that at least some shortened forms of the unshortened links exist on some link-shortening service 135 and thus have corresponding shortened link statistics. In embodiments in which statistics are obtained from the statistics server 115, the results presentation module 214 may present statistics even for links for which no shortened forms have been created.

Alternatively and/or additionally, the result presentation module 214 may order content items having links with associated link statistics in the user interface of the application 111, the order based at least in part on the associated link statistics. For example, the result presentation module 214 may use the link statistics (e.g., number of clicks on a shortened or unshortened link) associated with a content item's link as one factor affecting the ordering, along with other factors such as an original order in which the content items were provided by their content provider(s) 120, and the like.

The results presentation module 214 may perform this ordering for different types of content items with links, such as content items in a feed or search results from a search engine. In the case of search results from a search engine, which have links in unshortened rather than shortened form, the ordering is based on statistics on unshortened links. Some of the search result links may lack any shortened link statistics. In such a case, those search results may be ordered according to the remaining ordering factors, or, in embodiments in which unshortened link statistics are obtained from the statistics server 135, the search results may be ordered at least in part according to the unshortened link statistics.

In the case of content items in a feed, such as postings on a social network, some of the content items may lack a link, some may have a shortened link, and others may have an unshortened link. In one embodiment, a statistic type is chosen to be consistent across the shortened and unshortened links. For example, in the case of unshortened links, if a link-shortening service 135 provides aggregate statistics for a number of shortened links, along with a number of shortened links that the aggregate statistics represent, the results presentation module 214 and/or the link statistics module 213 can average the aggregate statistics to obtain an average for one single shortened link. This averaging of statistics for the unshortened links allows a more consistent comparison with the statistics for individual shortened links. Alternatively, rather than averaging the statistics for unshortened links, the unshortened link corresponding to a shortened link may be obtained, and aggregate statistics may be obtained for that unshortened link. In another embodiment, as noted, the statistics from the statistics server 115 (if present) can be used, instead of those from the link-shortening service 135.

In another embodiment, the result presentation module 214 provides visual emphasis to particular links based on their associated statistics. For example, visual emphasis may be employed where a given link has been found to be highly relevant based on a calculated relevance measure. Such visual emphasis serves to draw a user's attention to the emphasized link, thus alerting the user to the fact that the link may be of particular relevance to the user. Visual emphasis may be implemented using one or more of a number of different techniques, such as highlighting of the link background, changing font properties of the link text (such as using larger or bolder text), adding animation effects (such as blinking). Adding visual emphasis in this manner can be employed in the contexts both of a set of search results (e.g., highlighting search result links likely to be of relevance) and of a link embedded within content of a single discrete data item such as a social network message posting or a message of a message sharing service (e.g., bolding the link within the message if it is likely to be of relevance).

It is appreciated that the application 111 may have additional functionality beyond that provided by the modules 212-214 depicted in FIG. 2, which focus specifically on the use of statistics associated with links.

Figure 3:
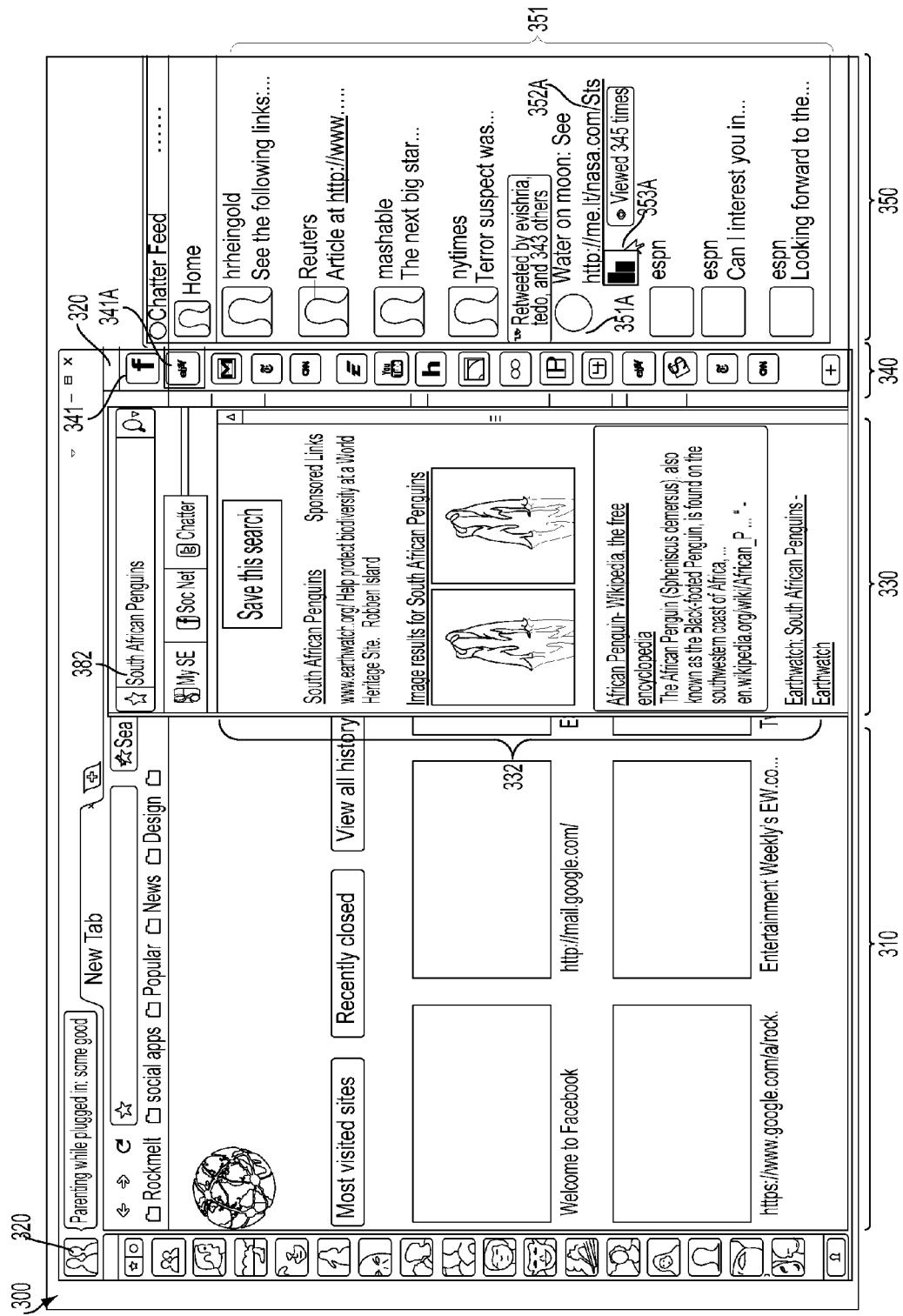
FIG. 3 is a screenshot of an example user interface in a window of a web browser application, according to one embodiment.

FIG. 3 is a screenshot of an example user interface 300 in a window of a web browser application 111 in which the modules 212-214 operate, according to one embodiment. The user interface 300 comprises functionality enabling rapid and convenient access to content items, such as web pages, content (e.g., message postings) from a social network such as FACEBOOK, messages from a message sharing service such as TWITTER, search results from a search engine such as GOOGLE, and the like, such content items being available via a network such as the Internet. More specifically, the user interface 300 comprises a content area 310 configured to display content items, such as web page content. The user interface 300 additionally comprises areas of the browser "chrome" 320, i.e., portions of the browser window, separate from the content area 310, that are not used to render any particular network-accessible documents. For example, areas of the chrome 320 in the interface of FIG. 2 include a search area 330 and a shortcuts area 340 containing graphical representations 341 that provide quick access to various feeds, saved searches, favorite sites, and the like.

Each feed displayed in the shortcuts area 340 provides new articles or other data items made available by a particular content provider 120. Subscription to a feed (and the associated addition of the feed to the shortcuts area 340) may be accomplished manually by a user, e.g., by clicking on a "Subscribe" button for an RSS feed on a web page, by indicating an interest in given keywords of a micro-blogging service or in a given user's postings on a social networking site, and the like. Alternatively, subscription may be automatic or semi-automatic; for example, logic within the browser could note that the user frequently visits a web page or web site associated with an RSS feed and accordingly add the feed to the shortcuts area 340, or request the user's permission to do so. In one embodiment, selecting (e.g., clicking on) a graphical representation displays the items associated with the corresponding feed. The items can be displayed in the content area 310, or in a separate window, for example.

For example, FIG. 3 illustrates feed items associated with the feed represented by feed icon 341A, displayed within a "pop-out" feed window 350 docked outside the main window 300. The depicted feed includes messages of a message sharing service to which the user is subscribed, each message being displayed within separate portions 351 of the feed window 350. Some of the feed items may contain links within their content. For example, feed item 351A pertains to a news report of a scientific discovery and contains a shortened URL 352A pointing to the content of the report. The browser application 111 may display the shortened URL in its shortened form, as with feed item 351A, or it may automatically expand the shortened URL to its full, original form by contacting the link-shortening service 135 that produced it. Feed items with links may additionally comprise a graphical representation 353A indicating a level of popularity of the links as measured by the link statistics. For example, the graphical indicator 353A depicted in FIG. 2 contains a number of bars, with more bars representing more viewings by users of the content referenced by the shortened link. Hovering the mouse on or near the shortened URL 352A or the graphical indicator 353A additionally causes the display of a more precise summary of the statistics, as shown in the tooltip text 354A listing the precise number of times that the shortened URL was viewed.

The feed items 351 can be ordered according to a number of different factors, and thus may have an order different from the order in which their corresponding content providers 120 provided them. For example, the feed items 351 can be ordered based on activity on a social networking site with respect to the links in the feed items (e.g., sharing of the links on the site), on frequency of occurrence of links within the feed items in a discussion stream such as that provided by a micro-blogging service such as TWITTER, and the like. Further, the shortened URL statistics for the feed item 351A can be used as one additional factor in determining the order in which the feed items 351 are displayed within the feed window 350. For example, feed items having shortened URL statistics with greater values may be given a higher ordering position than feed items having shortened URL statistics with lesser values and feed items lacking any such statistics.

The example user interface 300 additionally comprises a search area 330. The search area 330 includes a query entry area 382 into which a query (namely, "South African Penguins") has been entered, and a set of search results 332 obtained and displayed responsive to entry of the query. The search results 332 are obtained from a content provider 120, such as a search engine, or from a social network system or message sharing system that allow the client 110 to obtain discrete data units such as individual message postings. In the embodiment depicted in FIG. 3, the search results 332 are obtained from three content providers 120: a search engine "My SE," a social network "Soc Net," and a blogging service "Chatter;" the "My SE" tab is currently selected, and thus the search results 332 displayed are those obtained from the corresponding search engine. In other embodiments, the search results 332 may be displayed in other groupings, such as interspersed in a single search results list sorted according to relevance scores, each search result displaying an associated indication of the content provider 120 (e.g., the text "Soc Net" for the social networking data source), or as a set of groups sequentially displayed, each under a heading containing an associated indication of the data source.

Each search result 332 may have one or more links associated with it. For example, each search result 332 obtained from a search engine content provider includes a URL referencing the source of the data. Search results 332 obtained from social networking sites or message sharing services may also include a link within the content, such as a URL added by a user and referring to external content.

Like the feed items 351, the search results 332 can be ordered according to a number of different factors, including aggregate shortened URL statistics. For example, the search results with high values of the aggregate shortened URL statistics (e.g., high aggregate clicks/viewings) can be ranked higher in the order. Likewise, the search results 332 may also be ordered based on statistics derived from the statistics server 115.

It is appreciated that the user interface 300 is purely for purposes of example, and that other user interface configurations could equally be employed. The various areas of the chrome 320, for example, could be displayed in different locations of the user interface 300, such as along the bottom edge, or as individual floating windows or toolbars separately movable from the main browser window (e.g., after being "torn off" from the main window by the user). The user interface 300 need not comprise all the components described above, and/or it may comprise additional components not described. The various components may also be merged and/or separated in manners different from those described above; for example, the query entry 382 could be located within the search area 330, rather than within the main toolbar.

FIG. 4 is a flowchart of the high-level steps performed by the application 111, according to one embodiment. The content fetch module 212 obtains 410 a set of content items from one or more content providers 120, such as social networks, message sharing services, or search engines. Some of the obtained content items may comprise a link; for example, a search result comprises an unshortened link, and a message from a social network or message sharing service may contain one or more shortened or unshortened links, but need not contain any.

The link statistics module 213 obtains 420 link statistics associated with at least some of the links comprised by the content items by querying at least one link-shortening service 135 and/or the statistics server 115. The link statistics may include statistics on individual shortened links, aggregate shortened link statistics on unshortened links, and/or statistics tracked by the application 111 and provided to the statistics server 115.

The presentation module 214 then presents 430 the content items based at least in part on the obtained statistics. For example, the presentation module 214 could display a graphical representation of the statistics in visual association with one of the links, it could order the content items based at least in part on their associated link statistics, or it could visually emphasize a link based on the statistics.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification, such as the client 110, the content providers 120, the clients 125, and the link-shortening service 135, may include a single processor or may be architectures employing multiple processor designs for increased computing capability. The computers include conventional components such as secondary storage devices (e.g., hard disks), primary storage (e.g., main memory such as RAM), network access hardware (e.g. network interface cards), and the like.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for indicating relevance of shortened links to a user, the method comprising:
    obtaining a set of content items from one or more remote content providers, wherein a first one of the content items comprises a shortened link produced by a remote link-shortening server based on a first unshortened link that points to a first web page, and a second one of the content items comprises a second unshortened link that points to a second web page;
    obtaining statistics associated with the shortened link from the link-shortening server, the statistics comprising a first count of times that the first web page was accessed via the shortened link;
    obtaining statistics associated with a plurality of shortened links for the second unshortened link from a remote link-shortening server, the statistics comprising an aggregate count of times that the second web page was accessed via one of the plurality of shortened links and a count of the plurality of shortened links;
    computing, using the aggregate count and the count of the plurality of shortened links, an average count of times that the second web page was accessed via one of the plurality of shortened links;
    comparing the first count and the average count;
    ordering the first content item and the second content item in the set of content items based at least in part on the comparison; and
    displaying the content items according to the ordering within a browser user interface.

2. The computer-implemented method of claim 1, wherein the content items comprise discrete data units from a social network content provider.

3. The computer-implemented method of claim 2, wherein the discrete data units comprise message postings obtained in response to a query string submitted to the social network content provider.

4. The computer-implemented method of claim 1, wherein the content items comprise messages sent using a message sharing service content provider.

5. The computer-implemented method of claim 1, wherein the statistics associated with the shortened link comprise a count of times that the web pages were accessed via the shortened links by friends of the user on a social network.

6. The computer-implemented method of claim 1, further comprising visually emphasizing the shortened link responsive to the statistics associated with the shortened link indicating that the shortened link has a relevance measure that is above a predetermined relevance threshold.

7. The computer-implemented method of claim 1, further comprising displaying a graphical representation of one of the statistics associated with the shortened link in visual association with the shortened link.

8. The computer-implemented method of claim 1, further comprising at least one of:
    displaying at least a portion of the statistics associated with the shortened link in visual association with the shortened link, responsive to receiving using input indicating the shortened link; and
    displaying at least a portion of the statistics associated with the plurality of shortened links in visual association with the unshortened link, responsive to receiving using input indicating the unshortened link.

9. A non-transitory computer-readable storage medium having executable computer program instructions embodied therein for indicating relevance of links to a user, actions of the computer program instructions comprising:
    obtaining a set of content items from one or more remote content providers, wherein a first one of the content items comprises a shortened link produced by a remote link-shortening server based on a first unshortened link that points to a first web page, and a second one of the content items comprises a second unshortened link that points to a second web page;
    determining, using the remote link-shortening server, that the shortened link is a shortened form of the first unshortened link;
    obtaining statistics associated with the first unshortened link from a remote web server, the statistics comprising a first count of times that the first web page was accessed via the first unshortened link;
    obtaining statistics associated with the second unshortened link from a remote web server, the statistics comprising a second count of times that the second web page was accessed via the second unshortened link;
    comparing the first count and the second count;
    ordering the first content item and the second content item in the set of content items based at least in part on the comparison; and
    displaying the content items according to the ordering within a browser user interface.

10. The computer-readable storage medium of claim 9, wherein the content items comprise discrete data units from a social network content provider.

11. The computer-readable storage medium of claim 10, wherein the discrete data units comprise message postings obtained in response to a query string submitted to the social network content provider.

12. The computer-readable storage medium of claim 9, wherein the content items comprise messages sent using a message sharing service content provider.

13. The computer-readable storage medium of claim 9, further comprising displaying a graphical representation of one of the statistics in visual association with a corresponding one of the unshortened links.

14. The computer-readable storage medium of claim 9, the actions further comprising at least one of:
    displaying at least a portion of the statistics associated with the shortened link in visual association with the shortened link, responsive to receiving using input indicating the shortened link; and
    displaying at least a portion of the statistics associated with the plurality of shortened links in visual association with the unshortened link, responsive to receiving using input indicating the unshortened link.

15. The computer-readable storage medium of claim 9, the actions further comprising visually emphasizing the shortened link responsive to the statistics associated with the shortened link indicating that the shortened link has a relevance measure that is above a predetermined relevance threshold.

* * * * *